United States Patent [19]

Nashiki et al.

[11] Patent Number: 5,105,135
[45] Date of Patent: Apr. 14, 1992

[54] FEEDBACK CONTROLLER FOR NC CONTROLLED MACHINE TOOLS

[75] Inventors: Masayuki Nashiki; Shigeya Kitaori, both of Aichi, Japan

[73] Assignee: Okuma Machinery Works Ltd., Nagoga, Japan

[21] Appl. No.: 608,977

[22] Filed: Oct. 31, 1990

[30] Foreign Application Priority Data

Nov. 8, 1989 [JP] Japan .................................. 1-292035

[51] Int. Cl.$^5$ ........................................... G05B 19/407
[52] U.S. Cl. .............................. 318/568.11; 318/568.1; 318/568.18; 318/567; 318/434
[58] Field of Search ................................. 318/560–632, 318/254, 271, 135, 430–434

[56] References Cited

U.S. PATENT DOCUMENTS

| | | | |
|---|---|---|---|
| 4,353,020 | 10/1982 | Veale | 318/601 |
| 4,556,830 | 12/1985 | Schwalm et al. | 318/434 X |
| 4,774,445 | 9/1988 | Penkar | 318/567 X |
| 4,807,153 | 2/1989 | Onaga et al. | 318/563 X |
| 4,864,206 | 9/1989 | Onaga et al. | 318/568.11 |
| 4,864,209 | 9/1989 | Seki et al. | 318/611 |
| 4,876,494 | 10/1989 | Daggett et al. | 318/568.22 X |
| 4,882,528 | 11/1989 | Sogabe et al. | 318/568.1 X |
| 4,894,598 | 1/1990 | Daggett | 318/568.16 |
| 4,925,312 | 5/1990 | Onaga et al. | 318/568.22 X |
| 4,980,623 | 12/1990 | Anton | 318/432 |
| 4,988,935 | 1/1991 | York | 318/568.18 |

Primary Examiner—Paul Ip
Attorney, Agent, or Firm—Spensley Horn Jubas & Lubitz

[57] ABSTRACT

In a feedback controller for NC controlled machine tools, the position and the velocity of a work is detected and compared with the desired position. By this comparison, the work velocity is calculated and compared with the current velocity, which determines torque of a driving motor. A torque compensation signal generator, receiving the current velocity, generates a compensation signal according to a predetermined velocity/torque function. The signal is composed with a torque signal passed to a driving motor, and torque compensation is performed. A periodic reaction detector detects periodic fluctuation of the work caused by periodic load fluctuation, and a torque compensation direction causes a signal generator to suppress the fluctuation at desired occasions.

Figure 5:
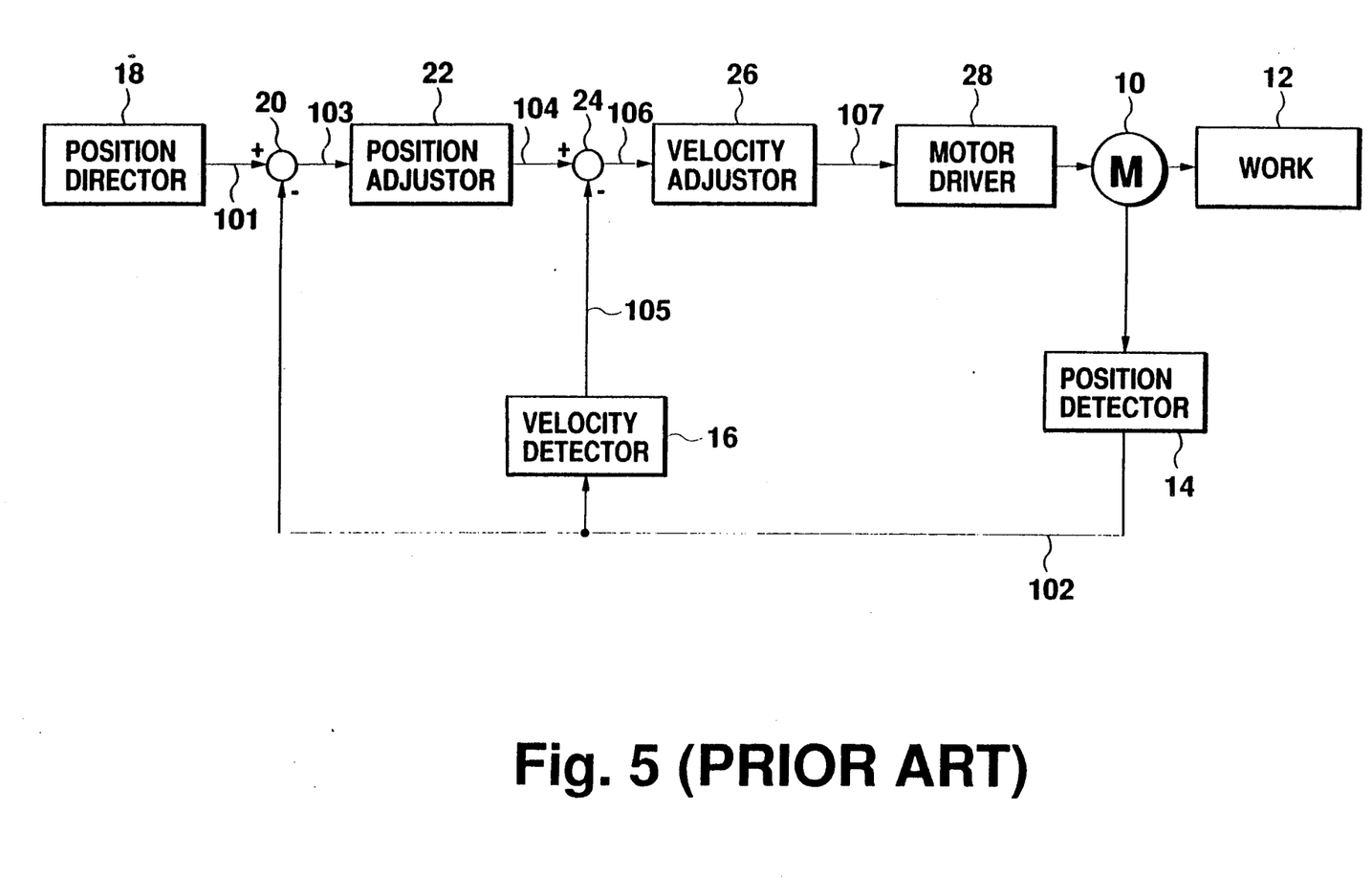
FIG. 5 shows a conventional feedback controller.

4 Claims, 7 Drawing Sheets

ated driving force for a work 12 to be machined or its bed on which the work 12 is fixedly mounted. The position detector 14 connected to the driving motor 10 detects the position of the work 12 in the straight or rotating movement (for example, the distance from a starting point on a base line, or the angle of rotation). In the figure, a velocity detector 16 detects the velocity of the work 12. In this example the velocity detector 16 gets a position detection signal 102 output from a position detector 14, and converts it into a velocity detection signal by differentiation.

FEEDBACK CONTROLLER FOR NC CONTROLLED MACHINE TOOLS

BACKGROUND OF THE INVENTION

1. Field of the Invention

The invention relates to a feedback controller for NC controlled machine tools, particularly to a feedback controller that suppresses oscillating reaction of feedback control systems caused by periodic load fluctuation.

2. Description of the Related Art

In the field of machining, various kinds of machine tools have been used and recently NC controllers that control machine tools according to the numerical controlling information are widely used. The NC controllers often use feedback control (servo control). In the feedback control the movement of a work is adjusted by the error obtained by comparison of a predetermined desired value and the current value of the movement. Therefore, with a feedback controller, the position and the velocity of the work are adjustable by monitoring its position and velocity.

FIG. 5 shows the conventional configuration of a feedback controller of machine tools. In the figure, a driving motor 10 supplies a predetermined driving force for a work 12 to be machined or its bed on which the work 12 is fixedly mounted. The position detector 14 connected to the driving motor 10 detects the position of the work 12 in the straight or rotating movement (for example, the distance from a starting point on a base line, or the angle of rotation). In the figure, a velocity detector 16 detects the velocity of the work 12. In this example the velocity detector 16 gets a position detection signal 102 output from a position detector 14, and converts it into a velocity detection signal by differentiation.

As shown in the figure, a position director 18 generates a positioning demand that reflects the desired position of the work 12 which is based on a predetermined machining program. A position demand signal 101 output from the position director 18 is input into the first difference detector 20 that outputs the difference of the established desired position and the detected current position of the work 12. The first difference detector 20 outputs the difference of the established desired position and the detected current position of the controlled work 12 by comparing both values. A position difference signal 103 supplied from the first difference detector 20 is input to the position adjustor 22 which converts the position difference signal 103 into a velocity signal 104 in order to move the work 12 to the desired position with appropriate velocity, using the amount of the position difference as the parameter.

The velocity signal 104 output from the position adjustor 22, along with the velocity detection signal 105, are input into the second difference detector 24 which calculates the difference of the signals and outputs a velocity difference signal 106. The velocity difference signal 106 is subsequently input into a velocity adjustor 26 which converts the velocity difference signal 106 into a torque signal 107 in order to adjust the velocity of the work 12. The torque signal 107 is input into a motor driver 28, amplified, and passed into the driving motor 10 that moves the work 12.

Therefore, with these feedback position control and feedback velocity control, the controlled work 12 can be moved to a desired position with a desired velocity.

However, the conventional feedback controller is sometimes unable to reduce recurrent load fluctuation properly, because the system also reacts for recurrent fluctuation in high reliability. For example, in case of end mill working using complex engine lathe equipped with a conventional feedback controller, the interval of the load fluctuation synchronizes with the response period of the feedback loop, and the movement of the work react synchronously, which can break the tool or decrease the working accuracy. This is because the work (which is fixed or rotating) receives intermittent load by the working tool. The conventional feedback controller can also cause a position error because the torque control by the driving motor 10 could not catch up with the external force from the tool.

Figure 6:
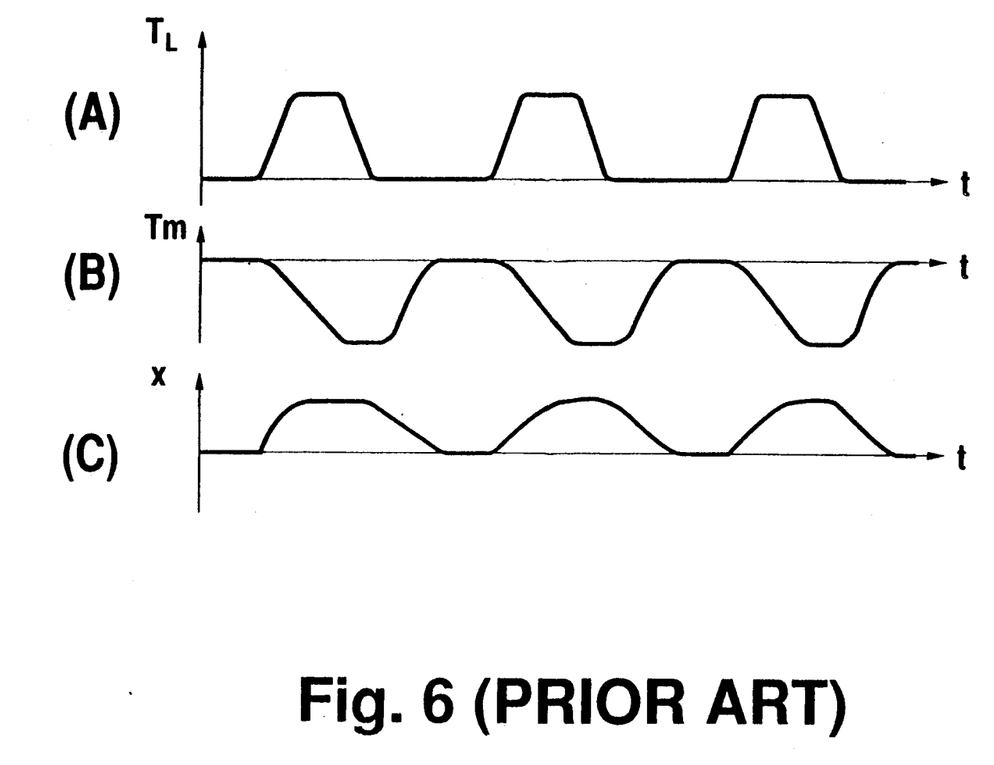
FIG. 6 shows a position error where a conventional controller is used for position control.

FIG. 6 shows the position error of the work that can result from the unbalance between the load torque $T_L$ and the motor torque $T_M$. In this figure, (A) shows the load torque ($T_L$), and (B) shows the motor torque ($T_M$) that opposes against the load torque ($T_L$) in the opposite direction, further (C) shows the distance (position error) $\Delta X$ from the desired position of the work. As shown in this figure, because of the delay of the motor torque against the intermittent force of the load torque, the position error ($\Delta x$) which decreases the working accuracy of the work is generated.

In order to suppress the oscillating reaction in the feedback control system caused by the recurrent external force, a conventional controller utilizes damping mechanism at movable parts of the tool. In other words, the reaction is suppressed by adding artificial load to the movable parts of machine tools using the viscous resistance of oil or sliding resistance of a disc brake.

Figure 7:
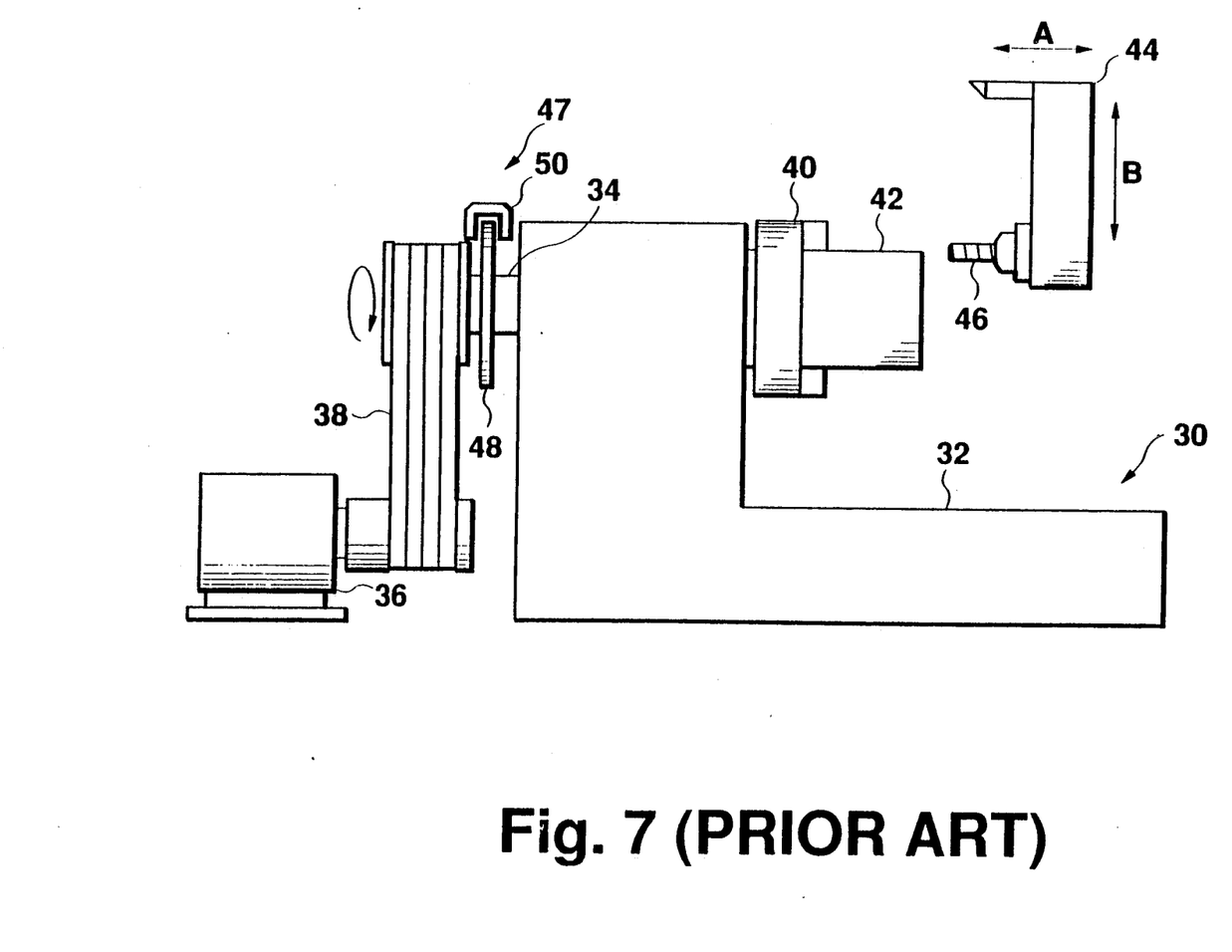
FIG. 7 shows a conventional complex engine lathe equipped with a disc brake.

FIG. 7 shows a complex engine lathe 30 with a disc brake that suppresses reaction of the feedback control system. A main spindle 34 pierces through a bed 32 of the complex engine lathe 30. A driving motor 36 is placed near the bed 32. Driving force generated by the driving motor 36 is transmitted to the main spindle 34 via a belt 38. The bed 32 is equipped with a chuck 40 that receives the force from the main spindle 34 and is positioned so that rotation in every direction is possible. The chuck 40 holds a work 42. Above the bed 32, there are a turret 44 that is movable in the direction A and B of the figure, and a rotating tool 46 attached to the turret 44. The complex engine lathe 30 has a disc brake system 47 comprising a disc with the main spindle 34 piercing through it, and a brake pad 50 surrounding the disc.

Using the complex engine lathe 30 with the above components, the work 42 receives external force intermittently and reaction of the feedback control system becomes periodic, for example, in the following cases: end mill working while fixing the position of the work 42; and cutting of the surface of a non-spherical work 42 by rotation.

For reducing these kind of reaction movements of the conventional feedback control system, the following method can be applied. A load caused by viscous resistance will be generated by holding the disc 48 with a brake pad 50. By the viscous resistance, the response characteristics of the feedback loop will change and the reaction in the system will be avoided. This method, however, makes the size of the apparatus bigger, causes mechanical loss of energy, and increase the cost.

SUMMARY OF THE INVENTION

The object of the present invention is to provide a fast feedback controller for NC controlled machine tools that suppresses the reaction of the feedback control system caused by the recurrent external force, without using any mechanical damping mechanism. In achieving the above objective, the present invention uses, for a feedback controller having a feedback position adjustor and a feedback velocity adjustor, a torque compensation mechanism that compensates the driving motor which drives the work according to its current velocity.

The torque compensation is based on predetermined velocity/torque functions and changes the torque as a subordinate means for adjustment. With this mechanism, when reaction of a feedback control system arises, prompt adjustment of the torque of the driving motor is enabled. Thus, positioning control of the work can be performed promptly. Moreover, using more than one velocity/torque function, appropriate feedback torque control can be obtained by switching the functions according to the shape and/or the weight of the work, which results in improved accuracy of the work position control and improved accuracy of the working itself. Furthermore, using a reaction detector that detects the periodic change of the work velocity, the appropriate torque compensation can be obtained by automatically activating the torque compensation mechanism.

DETAILED DESCRIPTION

Figure 1:
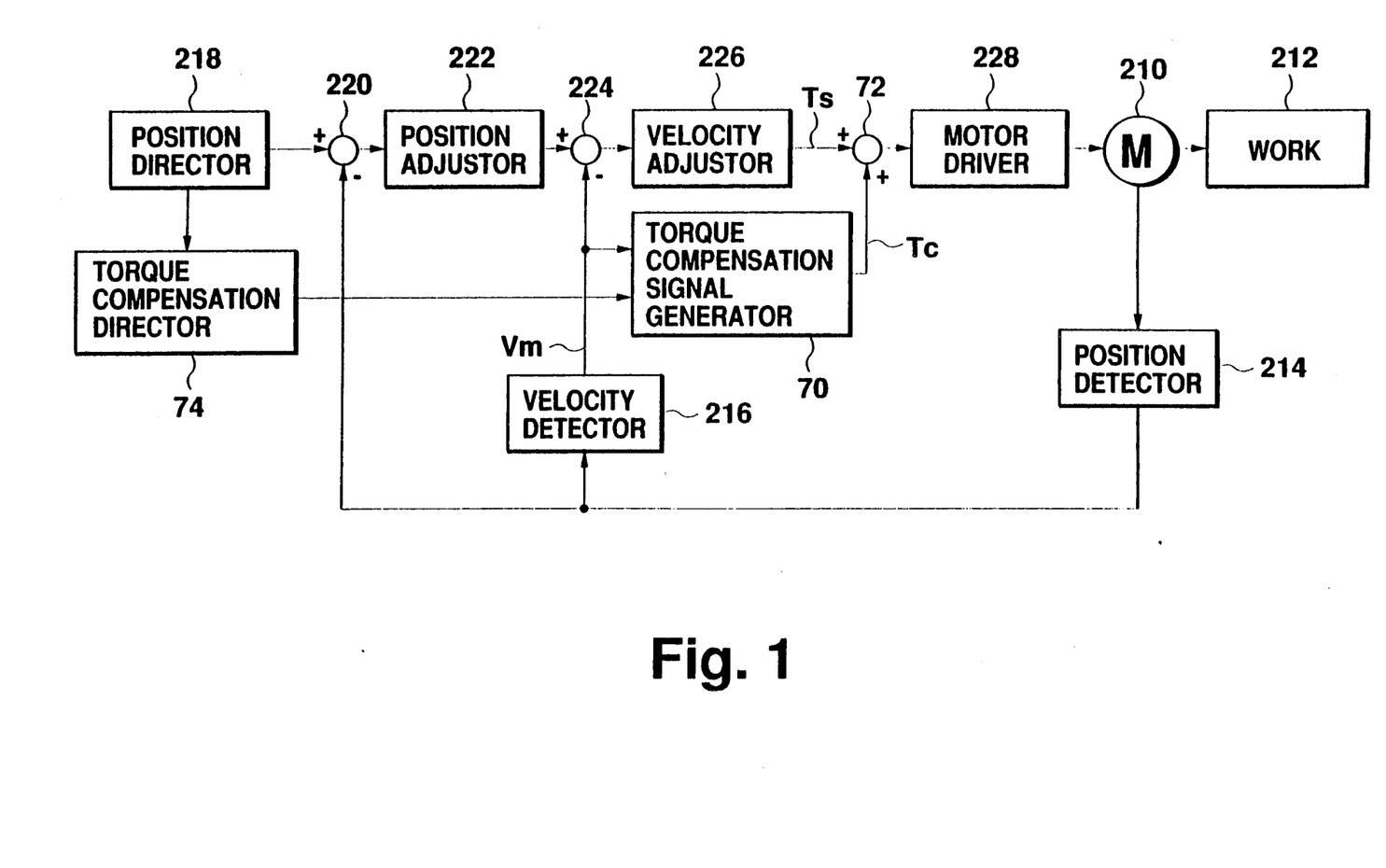
FIG. 1 shows a block diagram of the first embodiment in accordance with the present invention.

Detailed description of the present invention with an embodiment and figures follows. FIG. 1 is the overall structure of a feedback controller related to the present invention. In the figure, explanation of components of the controller already explained in FIG. 5 showing the conventional device is omitted and, instead, numerals with a number larger than the ones in FIG. 5 by 200 are attached.

The present invention includes a torque compensation mechanism that changes torque of a driving motor 210 in case of the reactional movement of a work. The torque compensation mechanism is comprised of a torque compensation signal generator 70 that outputs a torque compensation signal Tc by receiving a velocity signal Vm from a velocity detector 216, and performs predetermined velocity-torque conversion; and a torque signal composer 72 that composes the torque compensation signal Tc and a torque signal Ts generated by a velocity adjustor 226. The torque compensation signal generator 70 can store more than one velocity/torque function and one of them is chosen according to the shape and/or the weight of a work 212. The controller also has a torque compensation director 74 that controls the torque compensation signal generator 70. The torque compensation director 74 is in charge of switching on and off the torque compensation signal generator 70 and selecting a velocity/torque function in the torque compensation signal generator 70.

Figure 2:
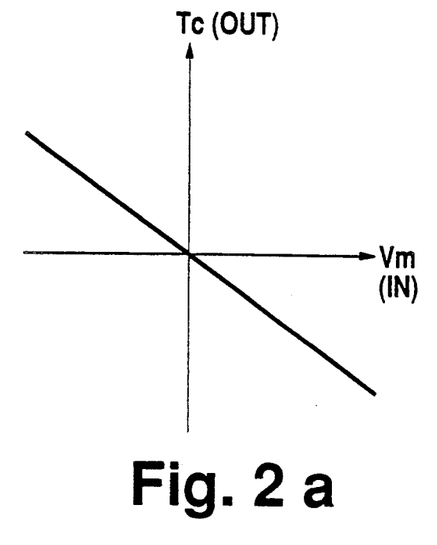
FIGS. 2a through 2d show examples of velocity/torque functions in the first embodiment of the present invention.

FIGS. 2a through 2d show examples of velocity/torque functions stored in the torque compensation signal generator 70. In these figures, the axis of abscissas is the input velocity signal Vm and the axis of ordinates is the output torque compensation signal Tc. FIG. 2a is a linear function. FIG. 2b shows a function that is linear within the interval a and b and has a constant torque value at other points. FIG. 2c shows a function that is linear within the interval c and d, and e and f, and has constant torque values at other points; within the interval d and e, the torque value is 0. FIG. 2d shows a function that has value 0 within the interval g and h and has constant values at other points. The form of velocity/torque functions is not limited to those indicated in FIGS. 2a through 2d. Appropriate functions are to be selected considering the shape and/or the weight of the work.

The operation of the controller shown in FIG. 1 will now be described. When reaction of the feedback control system due to external force is observed, the operator triggers the torque compensation signal generator 70 through the torque compensation director 74. Then, the velocity signal Vm from the velocity detector 216 will be received by the torque compensation signal generator 70, and the velocity signal Vm will be converted into the torque compensation signal Tc according to a predetermined velocity/torque function. In the torque signal composer 72, the torque signal Tc will be added to the torque signal Ts output by the velocity adjustor 226. By composing the two signals, the driving motor 210 will receive the current of different magnitude and the motor torque will be changed. Thus, by the prompt torque compensation, the reaction of feedback control systems caused by the intermittent external force will be suppressed. The torque compensation has the same effect as the damping mechanism with the disc brake described in the FIG. 7, but the controller of the present invention that uses electronic damping mechanism has better response. Therefore, possible decrease of the working accuracy and the damage of the tools due to the reaction of the feedback control system can be avoided and stable control of machine tools can be obtained.

Figure 3:
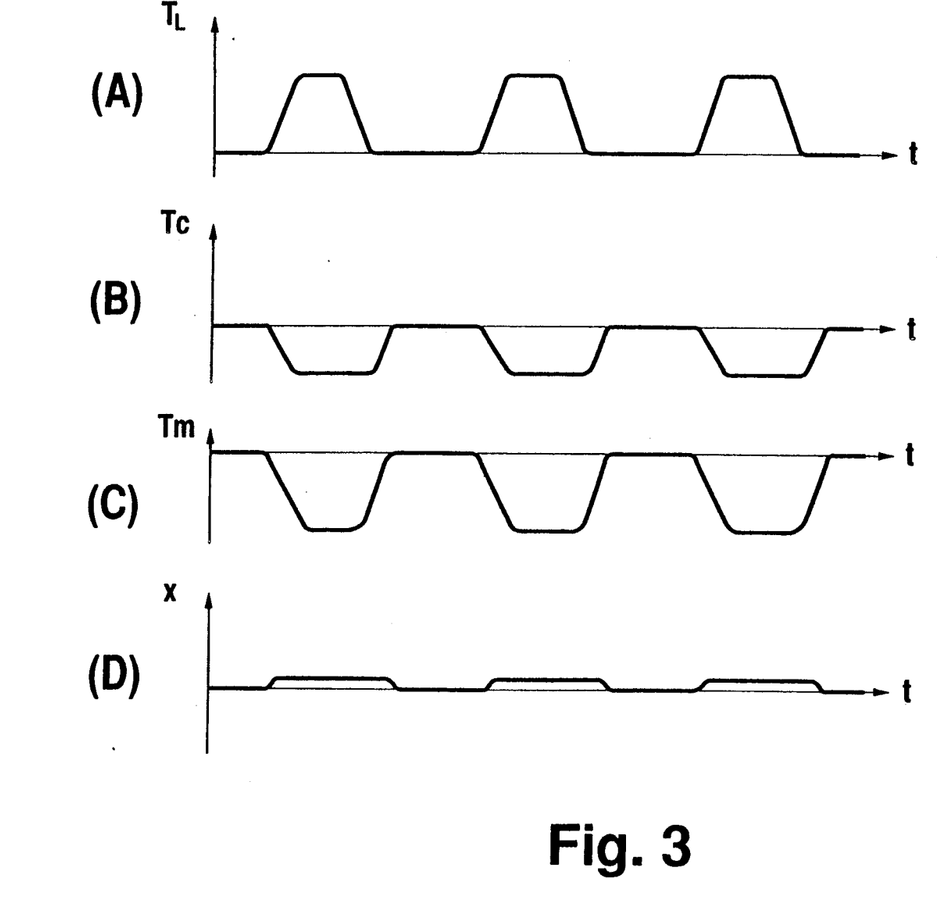
FIG. 3 explains the position error where position control is performed by the controller that relates to the present invention.

FIG. 3 shows a position error $\Delta x$ when the present feedback control system is utilized. In this figure, (A) shows load torque $T_L$. (B) shows a torque compensation signal Tc generated by the torque compensation signal generator 70. (C) shows motor torque $T_M$. (D) shows the distance from the desired position of the work 212, that is, the position error $\Delta x$. As shown in this figure, by promptly detecting the change of the load torque $T_L$ with the torque compensation signal generator 70 and generating the torque compensation signal Tc, the motor torque $T_M$ of the driving motor 210 can follow the intermittent load change of the torque $T_L$. As the result, the position error $\Delta x$ is minimized. Thus, using the present controller, the torque of the driving motor 210 can be promptly changed and the position error $\Delta x$ can be minimized.

Figure 4:
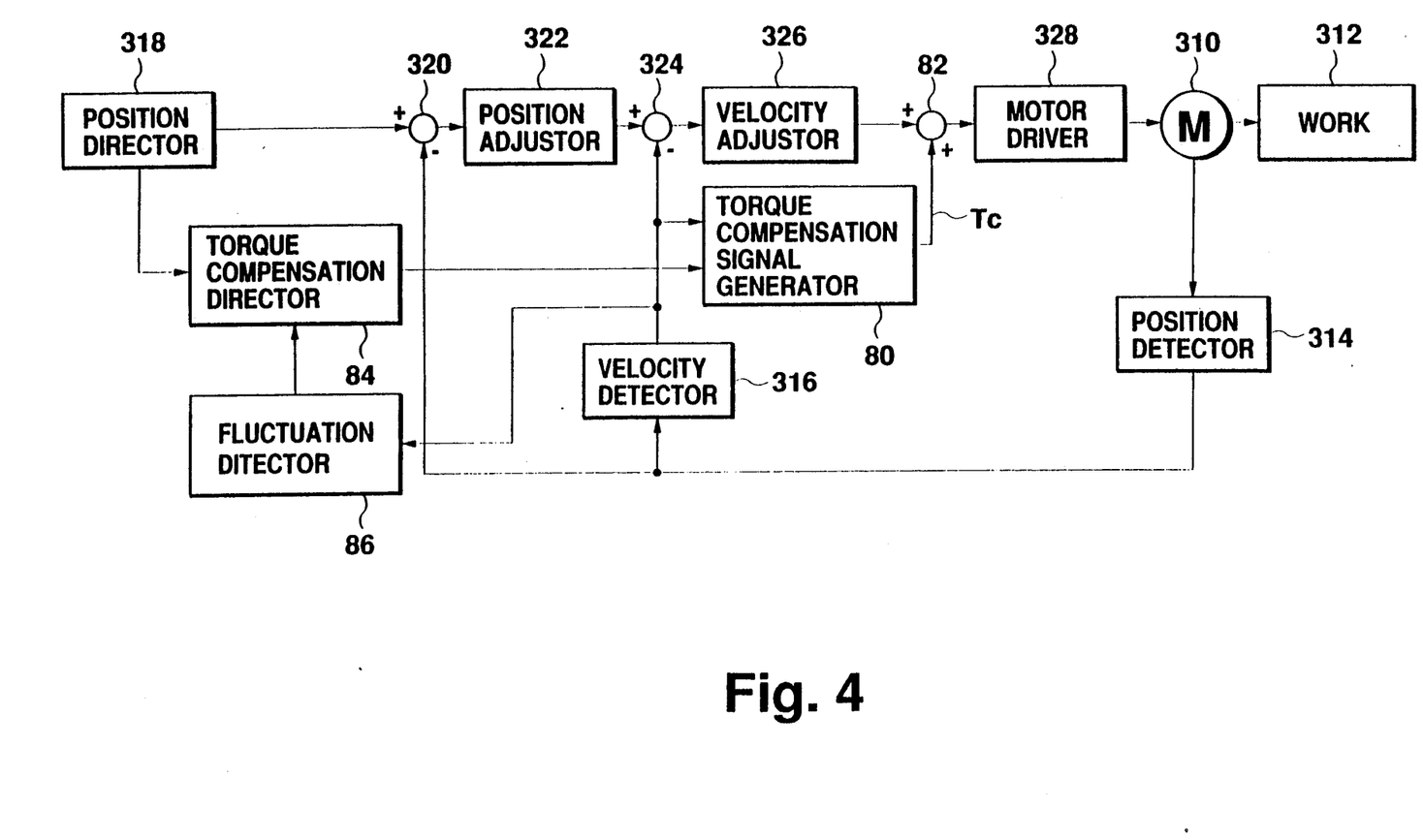
FIG. 4 shows a block diagram of the second embodiment in accordance with the present invention.

In FIG. 4, the second example of a feedback control system that relates to the present invention is described. In the figure, detailed description of components of the controller already explained in FIG. 5 are omitted and, instead, numerals with a number larger than the ones in FIG. 5 by 300 are attached. In this embodiment, the controller also has a torque compensation signal generator 80 and a torque signal composer 82. The periodic reaction detector 86 that gets velocity signal from a velocity detector 316, detects the periodic reaction change of a work 312. Typical components of the periodic reaction detector 86 can be a zero cross counter and a differentiator. The periodic reaction detector 86 automatically detects periodic reaction of the feedback control system. When the periodic reaction is detected, a fluctuation detection signal is supplied to a torque compensation director 84. Receiving the fluctuation detection signal, the torque compensation director 84 supplies a compensation starting signal to a torque compensation signal generator 80.

The switching of the velocity/torque functions stored in the torque compensation signal generator 80 can be based on the period of the fluctuation. To observe the fluctuation, it is possible to attach a torque detector to a driving motor 310 and send the torque detection signal to the torque compensation director 84. It is desirable to make the torque compensation signal generator 80 to be an analog circuit in order to get prompt response of the input and the output. It is possible to directly supply electric current for torque control from a velocity adjustor 326 to the motor driver 328, and perform the torque compensation by addition of electric current at the torque signal composer 82. Although all the functions in FIGS. 2a through 2d have negative gradient, it is possible to use functions with positive gradient. Velocity/torque functions with positive gradient can change the response characteristics of the feedback loop and can suppress the periodic reaction of the feedback control system.

As described above, with the feedback controller of machine tools in accordance with the present invention, better working accuracy of work can be obtained, because it electronically and promptly suppresses periodic reaction of a feedback control system, without any mechanical damping mechanism, and minimize the position error of the work. By changing the velocity/torque functions, appropriate torque compensation suitable for various kinds of work can be performed.

What is claimed is:

1. A feedback controller for NC controlled machine tools comprising:

(a) a driving motor driven by a torque signal to drive a work to be controlled for causing the work to have a current position and a current velocity at each instant;

(b) a position detector that detects the current position of the work;

(c) a velocity detector that detects the current velocity of the work;

(d) a position director that indicates a predetermined desired current position of the work;

(e) a feedback position adjustor for comparing the predetermined desired current position of the work and the current position of the work that is detected by the position detector for producing a desired current velocity of the work proportional to the difference between the compared positions;

(f) a feedback velocity adjustor that produces a first torque signal component by comparing the desired current velocity and the current work velocity detected by the velocity detector, the first torque signal component being proportional to the difference between the compared velocities;

(g) a torque compensation signal generator connected to the velocity detector for generating a second torque signal component which is a selected function of the current work velocity detected by the velocity detector; and (h) means for combining the first and second torque signal components to produce the torque signal in such that the presence of the second torque signal component in the torque signal reduces the difference between the current work position detected by the position detector and the desired current position of the work indicated by the position director.

2. A feedback controller according to claim 1 wherein said torque compensation signal generator is switchable between an active state for generating the second torque signal component and an inactive state in which the second torque signal component is not generated, and further comprising a torque compensation director connected to said torque compensation signal generator for switching said torque compensation signal generator between its active and inactive states.

3. A feedback controller according to claim 2 wherein said torque compensation signal generator is constructed for generating the second torque signal component according to any one of a plurality of respectively different functions, and said torque compensation director is operative for changing the function according to which the second torque signal component is generated.

4. A feedback controller according to claim 3 further comprising a periodic fluctuation detector that detects periodic velocity fluctuations of the work, and wherein said torque compensation director is connected to said periodic fluctuation detector for changing the function according to which the second torque signal component is generated in response to the periodic velocity fluctuation detected by said periodic fluctuation detector.

* * * * *